US007383313B2

(12) United States Patent
Fujibayashi

(10) Patent No.: US 7,383,313 B2
(45) Date of Patent: Jun. 3, 2008

(54) APPARATUS AND METHOD OF HEARTBEAT MECHANISM USING REMOTE MIRRORING LINK FOR MULTIPLE STORAGE SYSTEM

(75) Inventor: Akira Fujibayashi, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 1003 days.

(21) Appl. No.: 10/702,791

(22) Filed: Nov. 5, 2003

(65) Prior Publication Data

US 2005/0108187 A1 May 19, 2005

(51) Int. Cl.
*G06F 13/00* (2006.01)
(52) U.S. Cl. ...................... 709/213; 709/217; 709/220; 709/238
(58) Field of Classification Search ................ 709/213, 709/214, 217, 223, 225, 237, 238
See application file for complete search history.

(56) References Cited

U.S. PATENT DOCUMENTS

| 5,155,845 | A | 10/1992 | Beal et al. |
| 5,696,895 | A | 12/1997 | Hemphill et al. |
| 6,393,485 | B1 | 5/2002 | Chao et al. |
| 6,438,705 | B1 | 8/2002 | Chao et al. |
| 6,449,731 | B1 | 9/2002 | Frey |

(Continued)

FOREIGN PATENT DOCUMENTS

WO    WO 02/25443 A    3/2002

OTHER PUBLICATIONS

"Hitachi Freedom Storage Software Solutions Guide," Hitachi Data Systems Corporation Santa Clara, CA (Jan. 2003).

(Continued)

*Primary Examiner*—Viet D. Vu
(74) *Attorney, Agent, or Firm*—Townsend and Townsend and Crew LLP

(57) ABSTRACT

A distributed storage system includes a first data center including a first host and a first storage subsystem that are coupled to each other via a network. The first host includes a first check module configured to handle a heartbeat signal of first type. The first storage subsystem includes a first storage controller and a first monitoring module. The first monitoring module is configured to handle a heartbeat signal of second type. A second data center includes a second host and a second storage subsystem that are coupled to each other via a network. The second host includes a second check module configured to handle the heartbeat signal of first type. The second storage subsystem includes a second storage controller and a second monitoring module. The second monitoring module is configured to handle the heartbeat signal of second type. A third data center includes a third storage subsystem that are coupled to each other via a network. The third host includes a third check module configured to handle the heartbeat signal of first type. The third storage subsystem including a third storage controller and a third monitoring module. The third monitoring module is configured to handle the heartbeat signal of second type. A first communication network couples the first and second third hosts, wherein the hosts use the first communication network to transmit or receive the heartbeat signal of first type. A second communication network couples the first, second, and third storage subsystems, wherein the subsystems use the second communication network to transmit or receive the heartbeat signal of second type.

8 Claims, 13 Drawing Sheets

U.S. PATENT DOCUMENTS

| | | |
|---|---|---|
| 6,606,690 B2 | 8/2003 | Padovano |
| 6,609,213 B1 * | 8/2003 | Nguyen et al. ................. 714/4 |
| 6,636,981 B1 * | 10/2003 | Barnett et al. ................. 714/4 |
| 6,643,795 B1 | 11/2003 | Sicola et al. |
| 6,885,644 B1 * | 4/2005 | Knop et al. ................. 370/254 |
| 7,174,387 B1 * | 2/2007 | Shand et al. ................ 709/238 |
| 2002/0095489 A1 | 7/2002 | Yamagami |
| 2003/0097610 A1 | 5/2003 | Hofner |
| 2003/0126202 A1 | 7/2003 | Watt |
| 2004/0139125 A1 * | 7/2004 | Strassburg et al. .......... 707/202 |

OTHER PUBLICATIONS

"Veritas Clustering Support for EMC SRDF," product guide Veritas Software Corporation Mountain View, CA (Aug. 2002).

* cited by examiner

Table for Storage system ID: 60001

| ID 601 | Status 602 | ID 603 | Status 604 | ID 605 | Status 606 |
|---|---|---|---|---|---|
| 60002 | Alive | - | - | - | - |
| 60002 | - | 60003 | Alive | - | - |
| | - | 60003 | - | 60004 | Alive |

Fig. 4

Table for Storage system ID: 60003

| ID 601 | Status 602 | ID 603 | Status 604 |
|---|---|---|---|
| 60004 | Alive | - | - |
| 60002 | Alive | - | - |
| 60002 | - | 60001 | Alive |

Fig. 5

APPARATUS AND METHOD OF HEARTBEAT MECHANISM USING REMOTE MIRRORING LINK FOR MULTIPLE STORAGE SYSTEM

BACKGROUND OF THE INVENTION

The present invention relates to a storage system, more particularly, to a storage system distributed in multiple sites.

Data is the underlying resources on which all computing processes are based. With the recent explosive growth of the Internet and e-business, the demand on data storage systems has increased tremendously. Types of storage systems include a network-attached storage (NAS) or storage area network (SAN). A NAS uses IP over Ethernet to transports data in file formats between storage servers and their clients. In NAS, an integrated storage system, such as a disk array or tape device, connects directly to a messaging network through a local area network (LAN) interface, such as Ethernet, using messaging communications protocols like TCP/IP. The storage system functions as a server in a client-server system.

Generally, a SAN is a dedicated high performance network to move data between heterogeneous servers and storage resources. Unlike NAS, a separate dedicated network is provided to avoid any traffic conflicts between client and servers on the traditional messaging network. A SAN permits establishment of direct connections between storage resources and processors or servers. A SAN can be shared between servers or dedicated to a particular server. It can be concentrated in a single locality or extended over geographical distances. SAN interfaces can be various different protocols, such as Fibre Channel (FC), Enterprise Systems Connection (ESCON), Small Computer Systems Interface (SCSI), Serial Storage Architecture (SSA), High Performance Parallel Interface (HIPPI), or other protocols as they emerge in the future. For example, the Internet Engineering Task Force (IETF) is developing a new protocol or standard iSCSI that would enable block storage over TCP/IP, while some companies are working to offload the iSCSI-TCP/IP protocol stack from the host processor to make iSCSI a dominant standard for SANs.

A SAN is commonly used with distributed storage systems having storage sites distributed in a plurality of locations. These sites or data centers may be provided in relatively close proximity, e.g., within 10 miles, or far apart, e.g., 100 miles or more apart. The distributed storage system may be used to store redundant data for data security or to place the data centers in close proximity to the distributed business centers of an enterprise. The distributed or clustered systems are also used provide high speed data access to users of online services.

Currently, two operational modes are commonly used by storage systems to transfer data from one storage system (primary system) to another storage system (secondary system): synchronous mode and asynchronous mode. In synchronous mode, a write request from a host to the primary storage system completes only after write data are copied to the secondary storage system and acknowledge thereof has been made. Accordingly, this mode guarantees no loss of data at the secondary system since the write data from the host is stored in the cache of the primary system until the acknowledgement has be received from the secondary system. In addition, the primary volume (PVOL) in the primary storage system and the secondary volume (SVOL) in the secondary storage system are identically maintained, so that the SVOL can be used promptly used to replace the PVOL if the PVOL experiences failure. However, the primary and secondary storage systems cannot be placed too far apart, e.g., over 100 miles, under this mode. Otherwise, the storage system may not efficiently execute write requests from the host.

In asynchronous mode, a write request from a host to the primary storage system completes upon storing write data only to the primary system. The write data is then copied to the secondary storage system. That is, the data write to the primary storage system is an independent process from the data copy to the secondary storage system. Accordingly, the primary and secondary systems may be placed far apart from each other, e.g., 100 miles or greater. However, data may be lost if the primary system does down since the PVOL and SVOL identically maintained. Accordingly, it would be desirable to provide a data storage system or remote copy system that provides the benefits of the synchronous and asynchronous modes, i.e., enables the primary and secondary systems to be placed far apart while guaranteeing no data loss. An exemplary asynchronous remote copy method is disclosed in U.S. Pat. No. 6,408,370, to Yamamoto et. al, which is incorporated by reference.

In order to manage the distributed system above, it is important to know whether or not the sites are functioning properly or experiencing problem. This information is obtained using heartbeat signals. Accordingly, the reliable transmission of heartbeat signals is needed. However, the heartbeat signals are communicated using TCP/IP links by most storage units at this time. TCP/IP links, although widely used for its scalability and flexibility, are considered to be less reliable than other types of communication links, e.g., FibreChannel or ESCON. The heartbeat signals or information preferably should detailed, so that appropriate actions may be taken with minimal delay.

BRIEF SUMMARY OF THE INVENTION

Embodiments of the present invention provide one or more of the following features: (1) enable discovery of the remotely linked storage system via remote mirroring links, (2) share information on remotely linked storage systems among storage systems in the same cluster, (3) monitor the vitality of directly-linked remote storage systems, (4) obtain vitality of indirectly-linked remote storage systems, (5) use both remote mirroring links and TCP/IP links to obtain heartbeat signals for greater reliability, and (6) provide fine grain heartbeat information, e.g., which device at a particular site has been placed offline or is experiencing failure. With the use of robust links and more detailed heartbeat information, storage system the failover operation may be performed more promptly and more effectively.

In one embodiment, a distributed storage system includes a first data center including a first host and a first storage subsystem that are coupled to each other via a network. The first host includes a first check module configured to handle a heartbeat signal of first type. The first storage subsystem includes a first storage controller and a first monitoring module. The first monitoring module is configured to handle a heartbeat signal of second type. A second data center includes a second host and a second storage subsystem that are coupled to each other via a network. The second host includes a second check module configured to handle the heartbeat signal of first type. The second storage subsystem includes a second storage controller and a second monitoring module. The second monitoring module is configured to handle the heartbeat signal of second type. A third data center includes a third storage subsystem that are coupled to each other via a network. The third host includes a third check module configured to handle the heartbeat signal of first type. The third storage subsystem including a third storage controller and a third monitoring module. The third monitoring module is configured to handle the heartbeat signal of second type. A first communication network couples the first and second third hosts, wherein the hosts use the first communication network to transmit or receive the heartbeat signal of first type. A second communication network couples the first, second, and third storage subsystems, wherein the subsystems use the second communication network to transmit or receive the heartbeat signal of second type.

In one embodiment, a method for operating a distributed storage system includes transmitting a first storage-based heartbeat signal to a first storage subsystem associated with the distributed storage system; and obtaining topological information from the first storage subsystem in response to the first storage-based heartbeat signal, the topological information including information about a second storage subsystem that is linked to the first storage subsystem.

In another embodiment, a storage subsystem comprises a storage controller configured to handle requests received from a host; a storage area including a plurality of storage disks; and a remote mirroring module configured to transmit first topological information to a first remote storage subsystem to which the storage subsystem is coupled via a first communication link, the first topological information including information about a second remote storage subsystem to which the storage subsystem is coupled via a second communication link.

In another embodiment, a data center comprises a host configured to transmit data requests and a heartbeat signal of first type; a storage subsystem configured to receive the data request from the host and transmit a heartbeat signal of second type; and a remote mirroring module provided in the storage subsystem and configured to transmit first topological information to a first remote storage subsystem to which the storage subsystem is coupled via a first communication link, the first topological information including information about a second remote storage subsystem to which the storage subsystem is coupled via a second communication link. The module is configured to send a request to the first remote storage subsystem for second topological information and receive the second topological information, the second topological information including information about a third remote storage subsystem that is indirectly linked to the storage subsystem via the first remote storage subsystem. The module is configured to generate a vitality table using the second topological information received from the second storage subsystem, the vitality table including information on vitality of the first, second, and third remote storage subsystems.

In yet another embodiment, a computer readable medium including a program for monitoring vitality of devices in a distributed storage subsystem is disclosed. The program includes code for transmitting a first host-based heartbeat signal to a first host associated with the distributed storage system; code for transmitting a first storage-based heartbeat signal to a first storage subsystem associated with the distributed storage system; and code for generating a vitality table using topological information received from the first storage subsystem in response to the first storage-based heartbeat signal, the topological information including information about a second storage subsystem that is linked to the first storage subsystem, the vitality table including vitality information on the first and second storage subsystems.

As used herein, the term "storage system" refers to a computer system configure to store data and includes one or more storage units or storage subsystems, e.g., disk array units. Accordingly, the storage system may refer to a computer system including one or more hosts and one or more storage subsystems. The storage system may also be used to refer to a single storage subsystem or disk array unit.

As used herein, the term "storage subsystem" refers to a computer system that is configured to store data and includes a storage area and a storage controller for handing requests from one or more hosts. The storage subsystem may be referred to as a storage device, storage unit, storage apparatus, storage system, or the like. An example of the storage subsystem is a disk array unit.

As used herein, the term "host" refers to a computer system that is coupled to one or more storage subsystems and is configured to send requests to the storage subsystems. The host may perform the functions of a server or client.

As used herein, the term "clustered storage system" refers to a computer system having two or more storage subsystems that are interconnected for the purposes of improving reliability, availability, serviceability, and/or performance. The clustered storage system may have one or more hosts linked to the storage subsystems by a network or communication link.

As used herein, the term "distributed storage system" refers to a computer system having two or more storage subsystems provided at different locations. The term "distributed storage system" is used interchangeably with the term "clustered storage system."

As used herein, the term "heartbeat signal" refers to a signal that provides or requests vitality information to another remotely located device.

As used herein, the term "vitality information" refers to information as to whether a given device is functioning properly (e.g., alive) or is experiencing problem (e.g., dead or operating at reduce capacity). The vitality information may be stored in the form of a table.

BRIEF DESCRIPTION OF THE DRAWINGS

FIG. 4 illustrates a vitality table maintained by a first storage system according to one embodiment of the present invention.

FIG. 5 illustrates a vitality table maintained by the third storage system in the distributed storage system according to one embodiment of the present invention.

DETAILED DESCRIPTION OF THE INVENTION

Figure 1A:
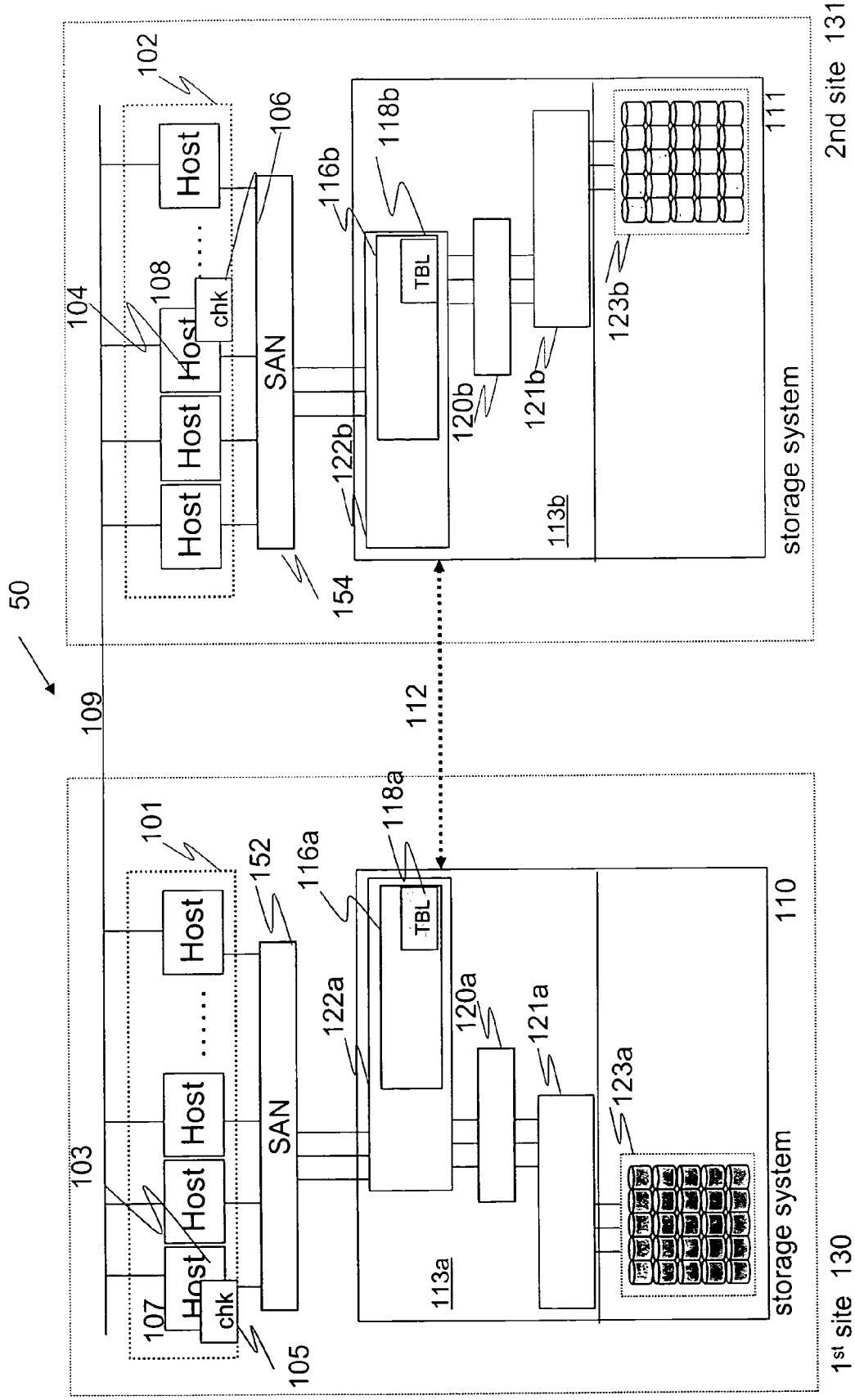
FIG. 1A illustrates a distributed storage system including a first data site or center and a second data site or center.

FIG. 1A illustrates a distributed storage system 50 including a first data site or center 130 and a second data site or center 131. The first site and devices associated with it are also referred to as the primary site and devices, and the second site and devices associated with it are also referred to as the secondary site and devices. The first data center includes a plurality of primary hosts 101 that are configured to send data requests to a storage subsystem 110. The data requests include read and write requests and may be referred to as I/O requests. The storage subsystem 110 includes one or more disk array units. The hosts and storage subsystem are coupled to each other via a communication network, e.g., SAN 152.

The second data center includes a plurality of secondary hosts 102 that are configured to send data requests (I/O requests) to a storage subsystem 110. The storage subsystem 110 includes one or more disk array units 113a. The hosts and storage subsystem are coupled to each other via a communication network, e.g., SAN 154.

The first and second data centers are coupled to each other via a TCP/IP network or link 109 and a remote mirroring link 112. Generally, the primary hosts 101 and secondary hosts 102 exchange administrative information via the TCP/IP link 109. A check module 105 is provided in a primary host to receive or poll for vitality information from its remote storage system 110 using the remote mirroring link. The module 105 is used also to receive or poll vitality information from other hosts in the first data center using the TCP/IP link 109. Similarly, a check module 106 is provided in a host in the secondary site to receive or poll for vitality information from the storage system 111 and hosts in the secondary site.

In operation, the check module 105 may initiate a failover procedure if it determines that only one primary host is alive and others have gone dead. That is, the secondary site 131 is made the production site for the distributed system 50. Alternatively, the failover may be initiated by the check module 106 if it determines that the primary site is experiencing failure, e.g., the check module 105 is dead.

In conventional systems, the check modules use only the TCP/IP link for transmitting and obtaining vitality information. The TCP/IP link, however, is not robust and may drop the link occasionally. At such a time, the host does not know whether the link has been dropped due to actual failure experienced by the remote storage system or due to a temporarily problem in the link. Accordingly, the failover decision cannot be promptly made until the actual failure has been confirmed. In one embodiment, the vitality information includes heartbeat signals that indicate whether or not the system on the other side of the link is in working properly or offline. Embodiments of the present invention use more robust remote mirroring links to transmit and obtain vitality information, as explained below.

The storage subsystems 110 and 111 use the remote mirroring link 112 to transmit data, e.g., to perform remote copy operations. The remote mirroring link is 112 is generally based on robust communication link to ensure reliable data communication. Examples of the remote mirroring link includes FC, IP, ATM, DWDM, Dark Fiber, T3, OC-192, and the like.

The storage subsystem 110a (or primary storage subsystem) includes a disk array controller 113a to manage access to storage areas 123a of the subsystem. The storage areas 123a may comprise a plurality of disks. The controller 113a includes a host adopter 122a, a routing device 120a, and a disk adaptor 121a. The host adopter 122a handles data requests received from the hosts. The data requests received from the hosts are then forwarded to the disk adaptor via the routing device. The switching device may be a switching fabric or bus. The disk adopter then accesses the storage areas 123a according to the request. If the request is a write request, the write data associated with the request is written in a given address. If the request is a read request, data is read from an address identified by the request. The read data is then sent to the host adapter via the disk adapter and the routing device. The host adapter then forwards the read data to the host that had requested the data. Similarly, the storage subsystem 111 (or secondary storage subsystem) has a disk array controller 113b that includes a host adopter 122b, a routing device 120b, a disk adaptor 121b, and storage areas 123b.

In one embodiment of the present invention, an alert module 116a is provide in the disk array controller to monitor the vitality of the secondary storage subsystem 111 using the remote mirroring link 112 for reliable polling of the vitality information. The link 112 may be used together with the TCP/IP link 109 or by itself. A vitality table 118a is maintained in the disk array controller. The table 118a includes topological and vitality information relating storage subsystems being monitored. The table 1118a may also include vitality information on the hosts being monitored. A threshold value may be provided for judging the occurrence of an alerting event that may require a failover operation to be performed. Similar alert module 116b and vitality table 118b are maintained in the disk array controller 113b of the secondary subsystem 111.

The present embodiment is illustrated below using exemplary hosts, first and second hosts 107 and 108, from the primary and secondary sites. The first and second hosts 107 and 108 are master hosts in respective data centers. The hosts 107 and 108 send heartbeat signals to each other in order to determine whether or not other data center is functioning properly. If either the first or second host 107 fails, another host in that data center serves as the master host according to a predetermined rule. The hosts in the respective data centers are coupled to each other via a local area network or wide area network.

Figure 1B:
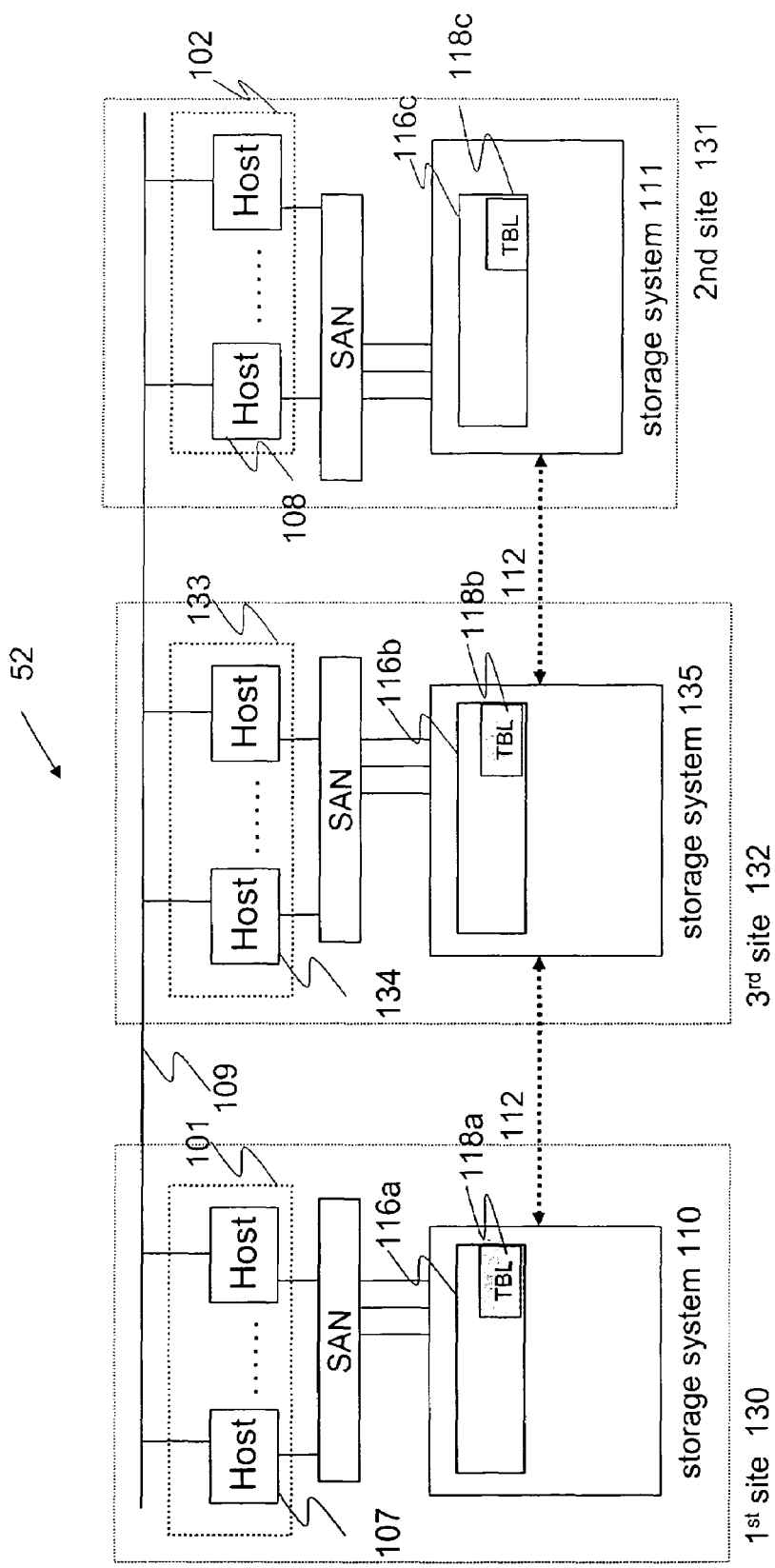
FIGS. 1B and 1C illustrate a distributed system having three data centers provided at three different sites according to one embodiment of the present invention.

FIG. 1B illustrates a distributed system 52 having three data centers 130, 131, and 132 provided at three different sites according to one embodiment of the present invention. The first or primary data center is connected to the second or secondary data center 131 via the third or intermediate data center 132. Generally, the same numerals are used to denote similar or identical devices as in FIG. 1A for illustrative purposes.

The primary data site 130 has a first or primary host group 101 and a first or primary storage system 110. The secondary site 131 has a second or secondary host group 102 and a second or secondary storage system 131. The intermediate data center has a third or intermediary host group 133 and a third or intermediary storage system 132.

The hosts in these groups are coupled to each other by a network 109 through which they communicate with each other using TCP/IP protocol in one embodiment. For example, a master host for each group checks the vitality or heartbeat signals of other host in its group and wells as the vitality of other host groups. The network 109 may be a local area network or wide area network, or a combination thereof.

Figure 1C:
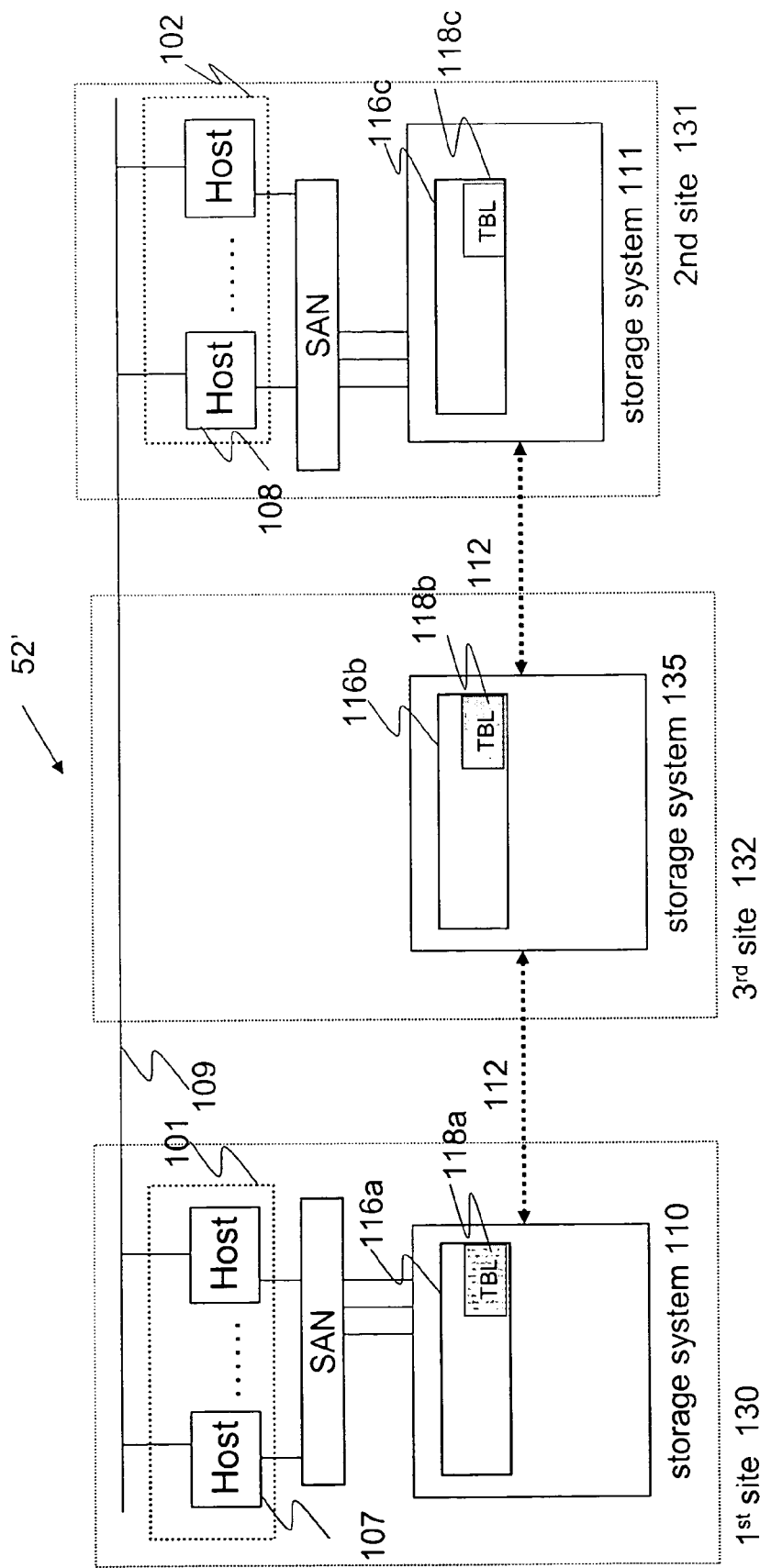

Each host group has one or more hosts. In one embodiment, the intermediate storage system is used as a temporary storage system and does not have a host associated with it, as shown in FIG. 1C. That is, the intermediate system does not need a host if it is not configured to serve as a production site during failover of the primary system. However, if it is configured to serve as a production site during failover, one or more hosts are required to make the data stored in the intermediate system accessible to users.

Each host group has a check module 105 or 106 (see FIG. 1A), also referred to as the resource monitoring module. This module operates as explained above in connection with FIG. 1A. If the module 105 for the primary system detects problem in its system, it fails over to the secondary or intermediate system according to a predetermined failover rule for the distributed system. However, if the intermediate system is not configured to serve as a production site during a failover state, the module 105 automatically failovers to the secondary system 131.

The failover operation may be initiated by the check modules in systems other than the primary system. For example, if the check module 106 of the secondary system determines that the primary system has failed or cannot effectively serve as a production site, then the module 106 initiates the failover operation, so that the secondary or intermediate system may serve as the production site.

Each storage system includes a disk array unit including a plurality of disks. Such a storage system may also be referred to as a storage subsystem. The storage systems 110, 111 and 135 are coupled to each other by one or more remote mirroring links 112. The remote links 112 are used to transfer data as well as communicate administrative information with each other. The remote links 112 generally tend to use more robust communication protocols than the network 109, e.g., ESCON, FibreChannel, Telecommunication lines, dark fiber, or combination thereof.

Each storage system includes an alert module 116a, 116b, or 116c. These modules are configured to collect topological and vitality information of the storage systems in the distributed system 52 using the remote mirroring links 112. The topological information provides information about storage systems provided in the distributed system 52 and how they are linked to each other. The vitality information relates to operating condition of one or more devices in the distributed system 52, e.g., whether a given device is dead or alive. In one embodiment, the vitality information may also provide information as to whether a given device is operating at an acceptable or unacceptable capacity.

First, second, and third vitality tables 118a, 118b, and 118c are generated and stored, respectively, in the first, second, and third storage systems, using the topological and vitality information retrieved from the links 112. Each storage system uses its vitality tables to determine occurrence of failure and identify of the failed device, as will be explained later.

Figure 1D:
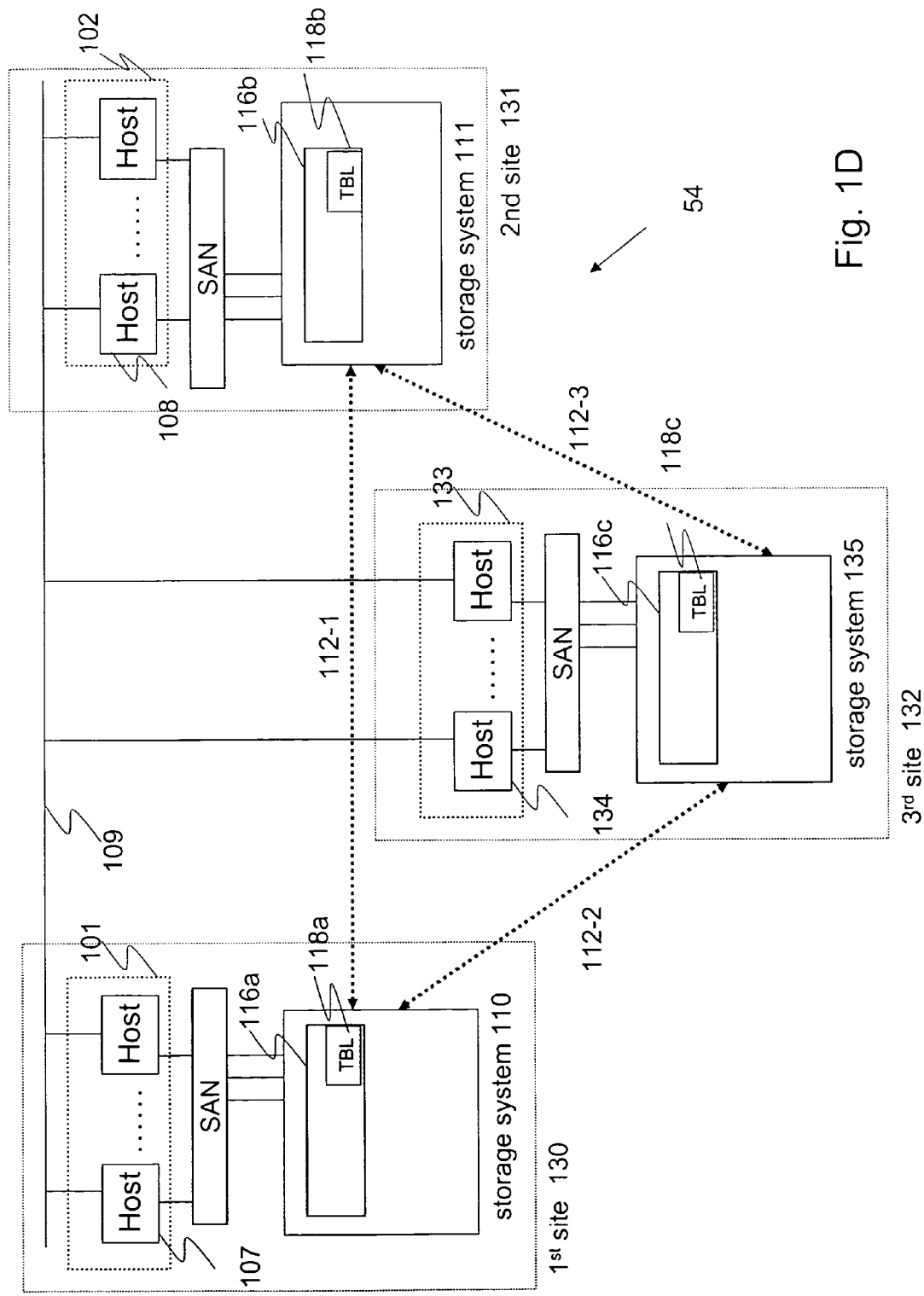
FIG. 1D illustrates a distributed storage system including three data centers provided in a loop configuration at three different locations according to one embodiment of the present invention.

FIG. 1D illustrates a distributed storage system 54' including three data centers 130, 131, and 132 provided in a loop configuration at three different locations according to one embodiment of the present invention. Generally, the same numerals are used to denote similar or identical devices for illustrative purposes.

The first data center 130 includes a first host group 101 and a first storage system 110. The second data center 131 includes a second host group 102 and a second storage system 111. The third data center 132 includes a third host group 133 and a third storage system 135. The host groups are coupled to each other via a network 109. Each host group includes one or more hosts. In one embodiment, the third data center does not include any host if the third data center is not configured to be a production site during a failover operation. Alternatively, the second data center, rather than the third data cente, may not be provided with any host if the second data center is not configured to be a production site during the failover operation.

The storage systems are coupled to each other via remote mirroring links 112. A first remote mirroring link couples the first and the second storage systems 110 and 111. A second remote mirroring link 112-2 couples the first and third storage systems 110 and 135. A third remote mirroring link 112-3 couples the second and third storage systems 111 and 135. Each remote mirroring link 112-1, 112-2, and 112-3 includes one or more communication links for transmitting data and administrative information. In the present configuration, the first and second storage systems may transmit data or administrative information directly with each other via the first link 112-1 without interfacing with the third storage system 135.

Each host group has a check module 105 or 106 (see FIG. 1A) provided in a master host to monitor resources of the respective data centers. This module operates as explained above in connection with FIG. 1A. If the module 105 for the primary system detects problem in its system, it fails over to the secondary or intermediate system according to a predetermined failover rule for the distributed system.

The failover operation may be initiated by the check modules in systems other than the primary system. For example, if the check module 106 of the secondary system determines that the primary system has failed or cannot effectively serve as a production site, then the module 106 initiates the failover operation, so that the secondary or intermediate system may serve as the production site.

The first, second, and third storage systems include first, second, and third alert modules 116a, 116b, and 116c, respectively. These modules are configured to collect topological and vitality information of the storage systems provided in the distributed system 54 using the remote mirroring links 112. For example, the first alert module 116a obtains the topological and vitality information of the storage systems using the links 112-1 and 112-2; the second alert module 116b obtains the topological and vitality information using the links 112-1 and 112-3; the third alert module 116c obtains the topological and vitality information using the links 112-2 and 112-3.

The topological information provides information about storage systems provided in the distributed system 54 and how they are linked to each other. The vitality information relates to operating condition of the devices in the distributed system 54, e.g., whether a given device is dead or alive. In one embodiment, the vitality information may also provides information as to whether a given device is operating at an acceptable or unacceptable capacity. First, second, and third vitality tables 118a, 118b, and 118c are generated and stored, respectively, in the first, second, and third storage systems, using the topological and vitality information retrieved from the links 112.

Each of the alert modules 116a, 116b, or 116c performs various functions to generate and maintain its vitality table: (1) discover and logical link setup, (2) perform periodic communication, and (3) exchange vitality status. The alert module is also referred to as a remote mirroring function set or remote mirroring module since it utilizes the remote mirroring links to perform the above operations. The module may also be referred to as a monitoring module.

Figure 2:
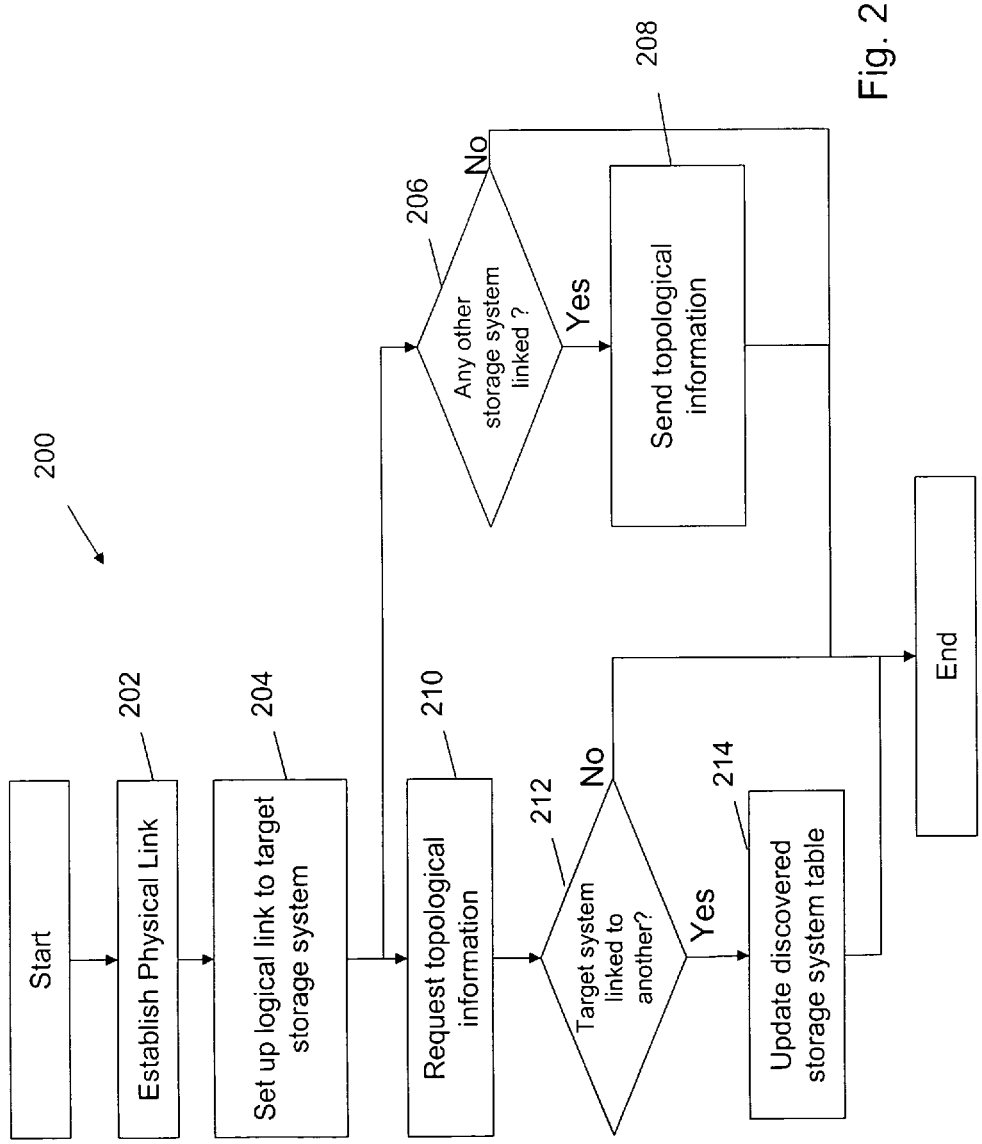
FIG. 2 illustrates a process of discovering and forming logical links between storage systems according to one embodiment of the present invention.

FIG. 2 illustrates a process 200 of discovering and forming logical links between storage systems according to one embodiment of the present invention. At step 202, a physical link is established between the first and second storage systems according to a standard method, e.g., FC login phase. For example, each storage system exchanges its World Wide Name and products name with the other. A logical link is formed at the first storage system to the second storage system (target system) as step 204. This is typically done manually by a network administrator. The first storage system transmits its topological information to the second system if the first system is linked to another storage system, e.g., third storage system, so that the target system is provided with such topological information (steps 206 and 208). Otherwise, the target system would not know that the first and third storage systems are linked. The first storage system sends a request to the second storage system for its topological information (step 210). If the first storage system does not receive the requested information, the first storage system concludes that the second storage system is not linked to any other storage system. If the first system receives the requested information (topological information), the received information is added to a discovered storage system table maintained by the first storage system (steps 212 and 214). The discovered storage system table provides information about all storage systems that are directly or indirectly linked to the first storage system. This table is used to form the vitality table 118.

Figure 3:
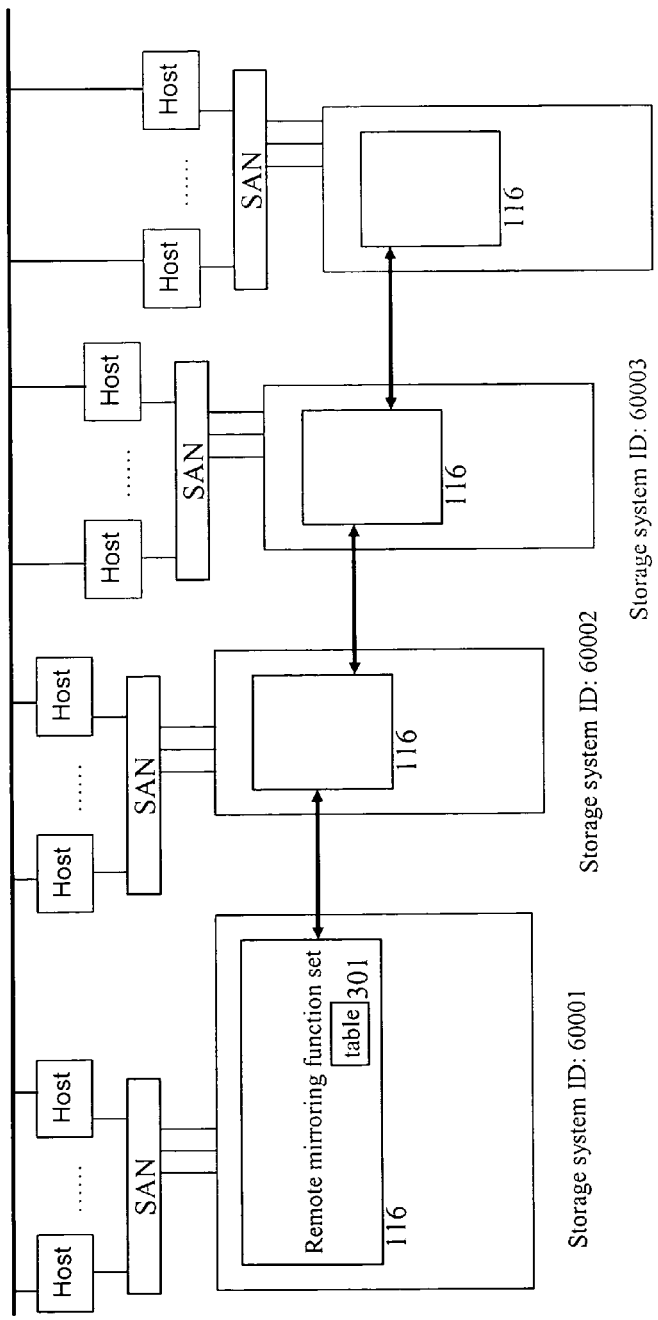
FIG. 3A shows a distributed system having a first storage system, a second storage system, a third storage system, and a fourth storage system that are linked serially from the first to fourth storage systems.
FIG. 3B illustrates a discovered storage system table maintained by a module in a storage system.

FIGS. 3A-3B visually illustrate the process 200 described above. FIG. 3A shows a distributed system 300 having a first storage system with ID information 60001, a second storage system with ID information 60002, a third storage system with ID information 60003, and a fourth storage system with ID information 60004, that are linked serially from the first to fourth storage systems. Each storage system includes a remote mirroring function set (or alert module) 116. Each module 116 maintains a discovered storage system table 301. In one embodiment, the first and fourth storage systems are linked to form a loop configuration (not shown).

FIG. 3B illustrates a discovered storage system table 301 maintained by the module 116 in the first storage system 60001. A field 401 of the table indicates the storage systems that are directly linked to the first storage system, in this case, the second storage system (#60002). A field 402 indicates the storage systems that are directly linked to the second storage system, in this case, the third storage system (#60003). A field 403 indicates the storage systems that are directly linked to the third storage system, in this case, the fourth storage system (#60004). The fields 402 and 403 are based on the topological information received from the second storage system (and corresponds to steps 212 and 214 of the process 200). The second storage system, in turn, obtains topological information corresponding to the field 403 from the third storage system. Accordingly, each storage system shares its topological information with other storage systems in order to generate a discovered storage system table, e.g., the table 301, that provides the topological information for the distributed storage system 300.

FIG. 4 illustrates a vitality table 118 maintained by the first storage system with identification number 60001 according to one embodiment of the present invention. A field 601 indicates the storage system that is directly linked to the first storage system. In this case, only the second storage system 60002 is directly linked to the first storage system. A field 602 indicates the status (e.g., vitality information) of directly linked storage system. In this case, the second storage system is indicated as being alive. A field 603 indicates storage systems that are directly linked to the second storage system. In this case, the third storage system is indicated as being directly linked to the second storage system. A field 604 indicates the status of storage systems indicated on the field 603. A field 605 indicates storage system directly linked to the third storage system. In this case, the fourth storage system is indicated as that storage system. A field 606 indicates the status of the storage system indicated in the field 605. The vitality table 118 describes the topology of the distributed storage system 300. The table indicates that the storage systems are provided in a chain configuration, where the first storage system is directly linked to the second storage system, and the second storage system is directly linked to the third storage system, and the third storage system is directly linked to the fourth storage system. The table also provides the status (e.g., vitality) of each of the storage systems.

FIG. 5 illustrates a vitality table maintained by the third storage system in the distributed storage system 300 according to one embodiment of the present invention. A field 602 indicates that the third storage system is directly linked to the second and fourth storage systems. A field 603 indicates the status of the storage systems indicated in the field 601. A field 603 indicates the storage system that is directly linked to the second storage system, in this case, the first storage system. A field 604 indicates the status of the storage system indicated in the field 603.

Figure 6:
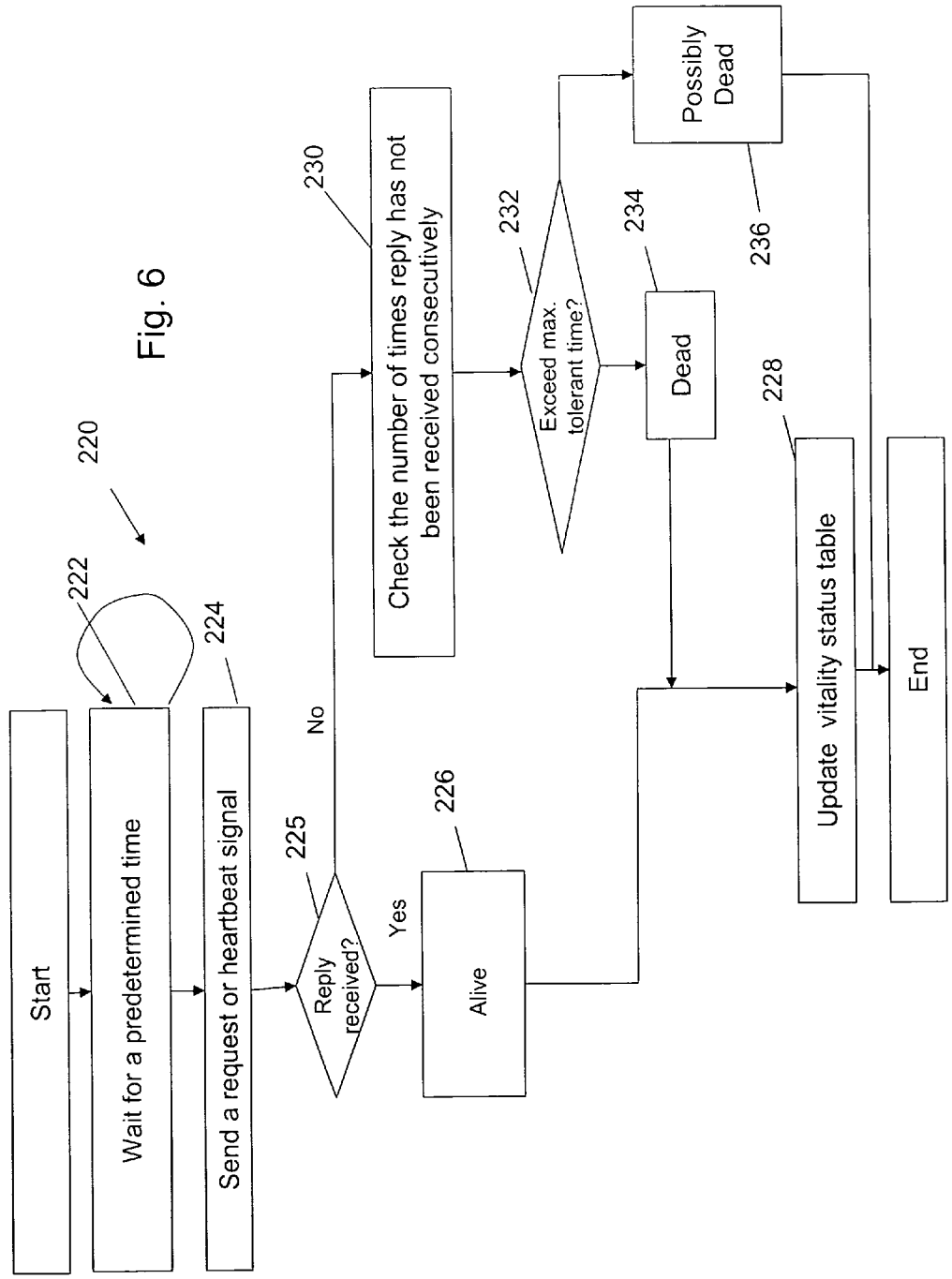
FIG. 6 illustrates a process for periodically communicating with linked storage systems via the remote mirroring link in order to determine the vitality of the linked storage systems according to one embodiment of the present invention.

FIG. 6 illustrates a process 220 for periodically communicating with linked storage systems via the remote mirroring link in order to determine the vitality of the linked storage systems according to one embodiment of the present invention. A storage system (initiating storage system) waits for a predetermined time before sending a vitality request (e.g., heartbeat signal) to a target storage system that are directly linked to the initiating storage system (steps 222 and 224). This is also referred to as polling. The request may be a command defined in a given standard (e.g., SCSI inquiry command) or a proprietary command. If a replay is received from the target storage system to which the request has been sent, the initiating storage system notes in its vitality table that the target storage system is "alive" (steps 224 and 226). The reply from the target storage system includes vitality information of storage systems that are either directly or indirectly linked to the target storage system. The received information is used to update the vitality table of the initiating storage system (step 228).

At step 224, if the reply from the target storage system is not received by the initiating storage system, the initiating storage system determines how many times continuously the reply was not received (step 230). If the continuous non-reply exceeds a given threshold value, the target storage system is indicated as being "dead" (steps 232 and 234). In one embodiment, the initiating storage system sends an alert signal (e.g., SNMP trap) to hosts when it determines that the target storage system is dead.

At step 232, if the continuous non-replay does not exceed the threshold value, the target storage system is indicated as being "possibly dead" (step 236). In one embodiment, a counter keeping track of the non-reply is incremented by 1. The threshold value may be set to any given value by a network administrator according to application.

In one embodiment, the vitality of the distributed storage system is checked using the host-based and storage-system-based heartbeat signals to provide a more reliable and fine resolution heartbeat mechanism. Such a mechanism is more reliable since two difference types of heartbeat signals are used, the host-based and storage-system-based, and since the storage-system-based heartbeat signals use robust communication link. In addition, a fine resolution is obtained since it is possible to determine whether a failure is due to a host failure, storage system failure, entire data center failure, or merely communication link failure, as explained in more detail below in connection with FIGS. 7-10.

Figure 7:
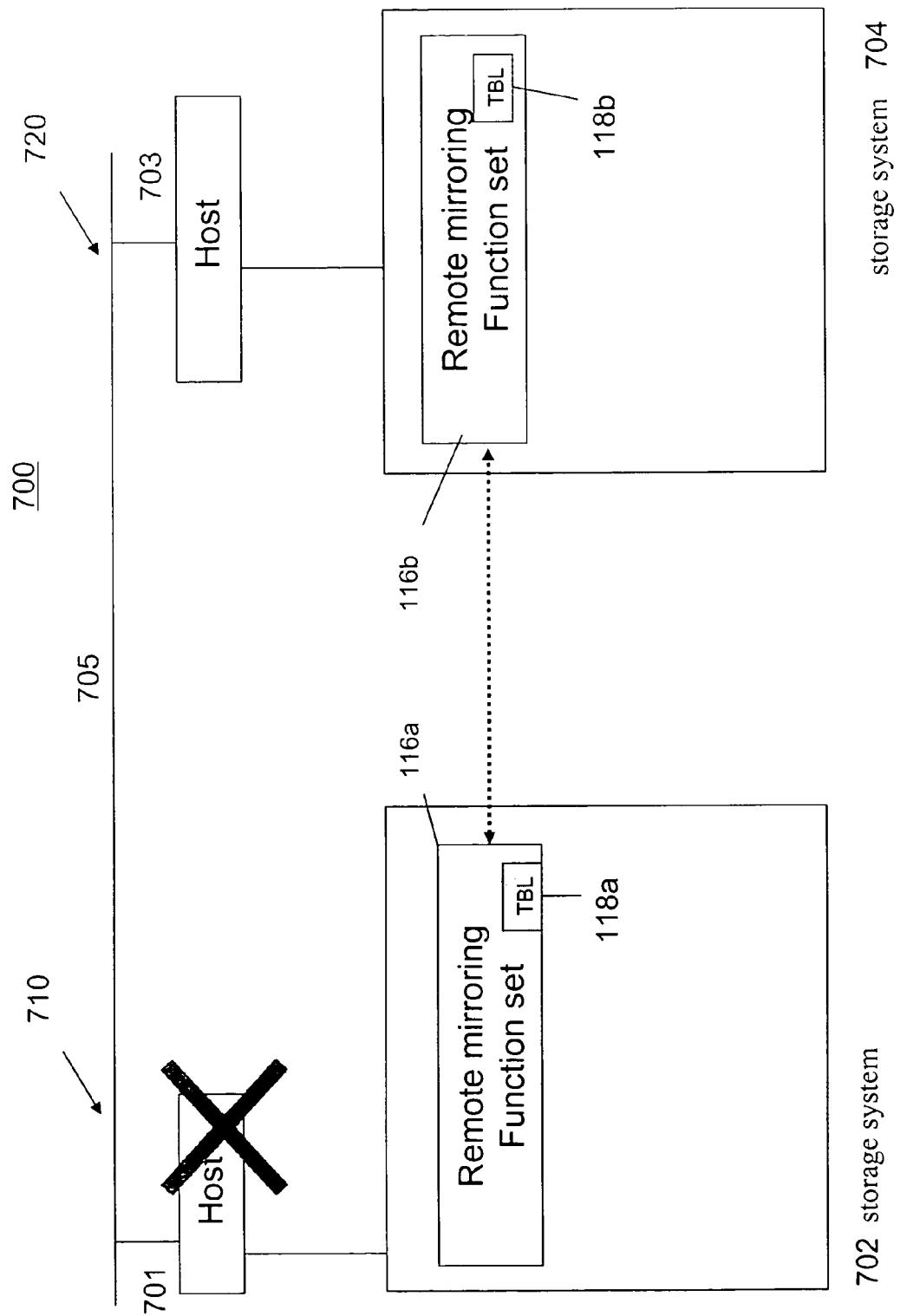
FIG. 7 illustrates a method of detecting a host failure according to one embodiment of the present invention.

FIG. 7 illustrates a method of detecting a host failure according to one embodiment of the present invention. A distributed storage system 700 includes a first data center 710 and a second data center 720. The first data center includes a host 701 and a storage system 702. The second data center includes a host 703 and a storage system 704. Each storage system includes a remote mirroring function set or alert module 116. The module 116 maintains a vitality table 118. If the host 701 fails, the host 701 would not respond to a heartbeat signal transmitted by the host 703. The host 703 would then know that the first data center is experiencing a failure. Just based on the non-reply of its heartbeat signal (host-based heartbeat signal), however, the host 703 would not know that the failure is due to the host failure, storage system failure, or entire data center failure. However, the modules 116 of the storage systems exchange heartbeat signals and maintain the vitality tables 118. The host 703 is provided with the vitality table of the storage system 704, which indicates that the storage system 702 is alive. The host 703 would therefore know that the failure at the first data center is due to the host failure.

Figure 8:
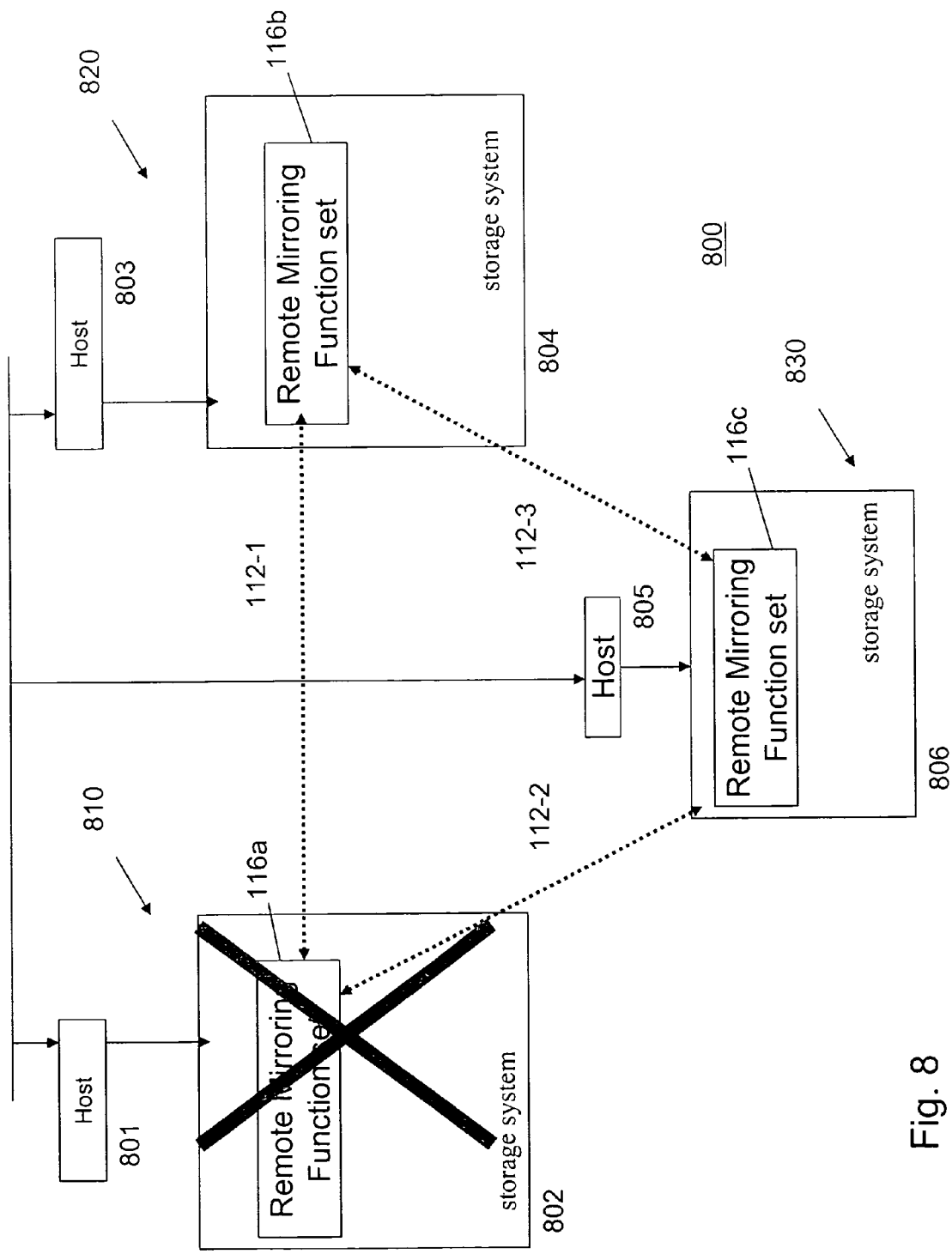
FIG. 8 illustrates a method of detecting a storage system failure according to one embodiment of the present invention.

FIG. 8 illustrates a method of detecting a storage system failure according to one embodiment of the present invention. A distributed storage system 800 includes first, second and third data centers 810, 820, and 830. The first date center includes a host 801 and a storage system 802. The storage system 802 includes a remote mirroring function set or alert module 116a. The second date center includes a host 803 and a storage system 804. The storage system 802 includes a remote mirroring function set or alert module 116b. The third date center includes a host 805 and a storage system 806. The storage system 806 includes a remote mirroring function set or alert module 116c.

The modules 116a, 116b, and 116c exchange heartbeat signals with each other to keep track of the vitality of the storage systems in the distributed storage system. If the storage system 802 fails, the storage systems 804 and 806 detects that the storage system 802 has failed. However, the hosts 803 and 805 continue to receive host-based heartbeat signals from the host 801. Therefore, the hosts 803 and 805 determine that the failure detected is due to a storage system failure.

Figure 9:
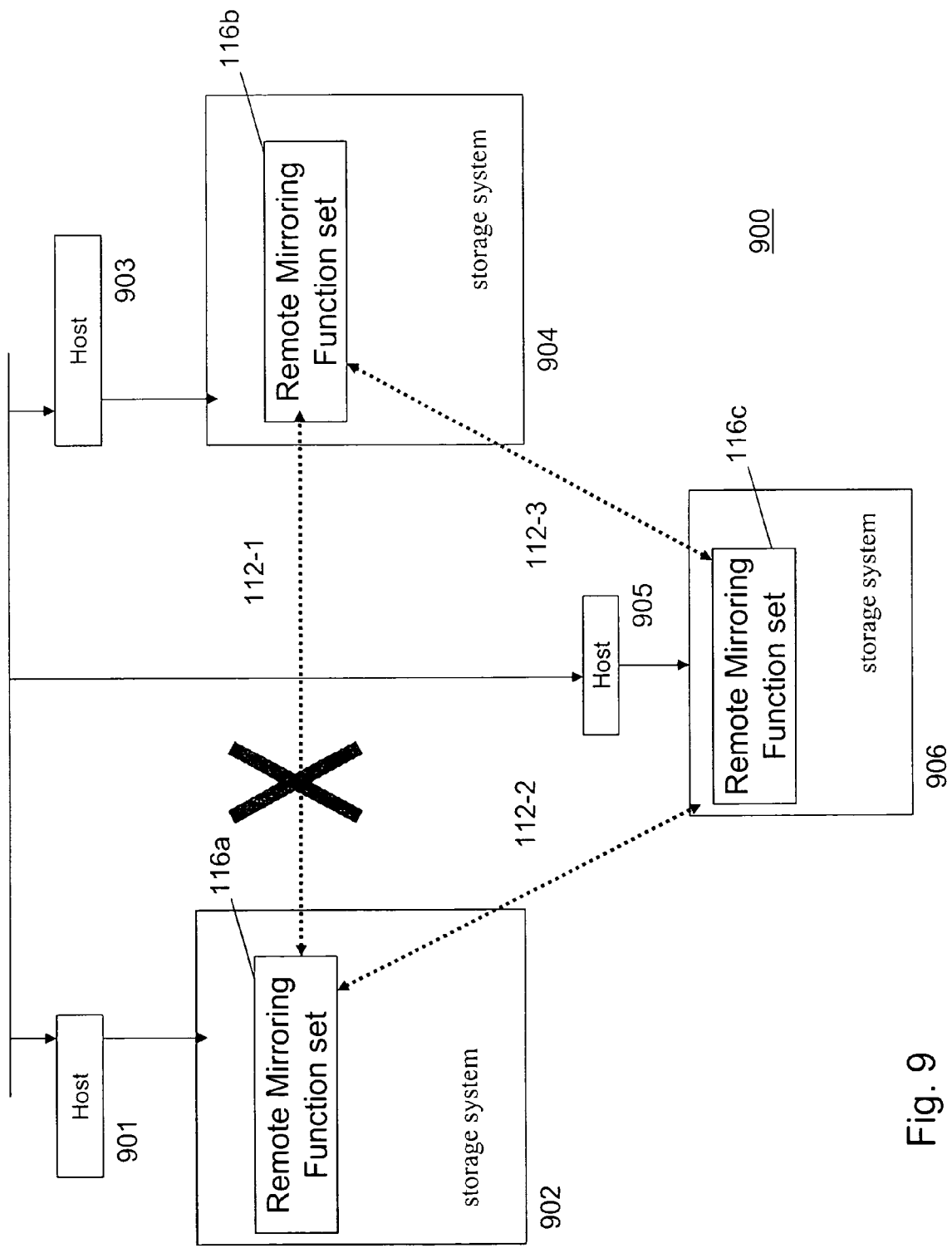
FIG. 9 illustrates a method of detecting a link failure according to one embodiment of the present invention.

FIG. 9 illustrates a method of detecting a link failure according to one embodiment of the present invention. A distributed storage system 900 includes first, second and third data centers 910, 920, and 930. The first date center includes a host 901 and a storage system 902. The storage system 902 includes a remote mirroring function set or alert module 116a. The second date center includes a host 903 and a storage system 904. The storage system 902 includes a remote mirroring function set or alert module 116b. The third date center includes a host 905 and a storage system 906. The storage system 906 includes a remote mirroring function set or alert module 116c. The storage systems 902 and 904 are coupled to each other via a remote mirroring link 112-1. The storage systems 902 and 906 are coupled to each other via a remote mirroring link 112-2. The storage systems 904 and 906 are coupled to each other via a remote mirroring link 112-3.

If the remote mirroring link 112-1 fails, the module 116b cannot receive any storage-system based heartbeat signals from the storage system 902 and considers the storage system 902 to be dead. However, the storage system 906 receives heartbeat signals from the storage system 905 via the link 112-2. This information is convey to the host 905 and to the storage system 904 by the storage system 906. Therefore, it is possible to deduce that the failure detected by the storage system 904 is due to a link failure rather than an actual storage system failure.

Figure 10:
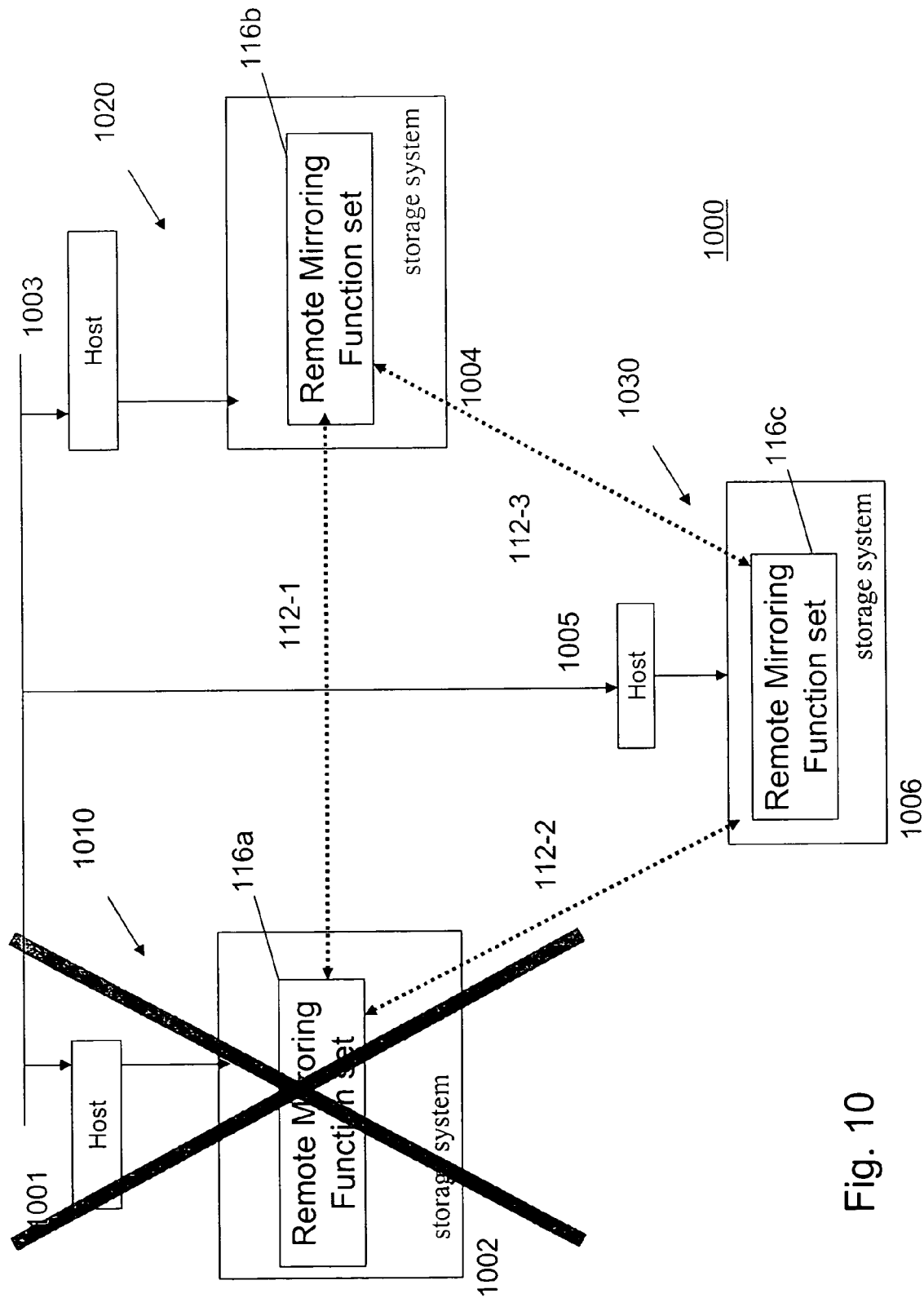
FIG. 10 illustrates a method of detecting an entire data center failure according to one embodiment of the present invention.

FIG. 10 illustrates a method of detecting an entire data center failure according to one embodiment of the present invention. A distributed storage system 1000 includes first, second and third data centers 1010, 1020, and 1030. The first date center includes a host 1001 and a storage system 1002. The storage system 1002 includes a remote mirroring function set or alert module 116a. The second date center includes a host 1003 and a storage system 1004. The storage system 1004 includes a remote mirroring function set or alert module 116b. The third date center includes a host 1005 and a storage system 1006. The storage system 1006 includes a remote mirroring function set or alert module 116c. The storage systems 1002 and 1004 are coupled to each other via a remote mirroring link 112-1. The storage systems 1002 and 1006 are coupled to each other via a remote mirroring link 112-2. The storage systems 1004 and 1006 are coupled to each other via a remote mirroring link 112-3.

If the entire first data center fails, e.g., an major earthquake occurs at that area, the host 1001 is dead so its would not transmit any heartbeat signals to the hosts 1003 and 1005. The storage system 1002 also would not transmit any heartbeat signals to the storage systems 1004 and 1006. The hosts 1003 and 1005, therefore, would determine that the entire first data center has failed since neither host-based nor storage-system-based heartbeat signal is received from the first data center.

As illustrated above, the heartbeat mechanism of the present embodiment using both the host-based and storage-system-based heartbeat signals provides a greater reliability and finer failure resolution. With the fine resolution failure determination, the failover operation may be performed more effectively. For example, if it is determined that only the host is dead, the failover to the secondary storage system may be delayed since the storage system (primary storage system) for that data center may have a queue of data that need to be transmitted to the secondary storage system. In such a case, the failover to the secondary storage system is delayed until all the data have been transferred from the primary storage system to the secondary storage system. However, if it is determined that the primary storage system is dead, the failover operation may be performed immediately since the primary storage system cannot transmit any data to the secondary system.

More effective failover operation provided in the present embodiment is particularly desirable for storage-intensive users, e.g., banks, brokerage firms, insurance companies, and the like, since they have tremendous amount of data at are distributed apart great distances. In certain application, only the storage-system-based heartbeat signals may be used.

In yet other applications or embodiments, the storage systems send and receive heartbeat signals to each other without collecting topological information. In one implementation, the topological information is provided by an administrator to the storage systems, so that vitality tables, if needed, may be created at these storage systems without collecting the topological information at the storage system level.

Figure 11:
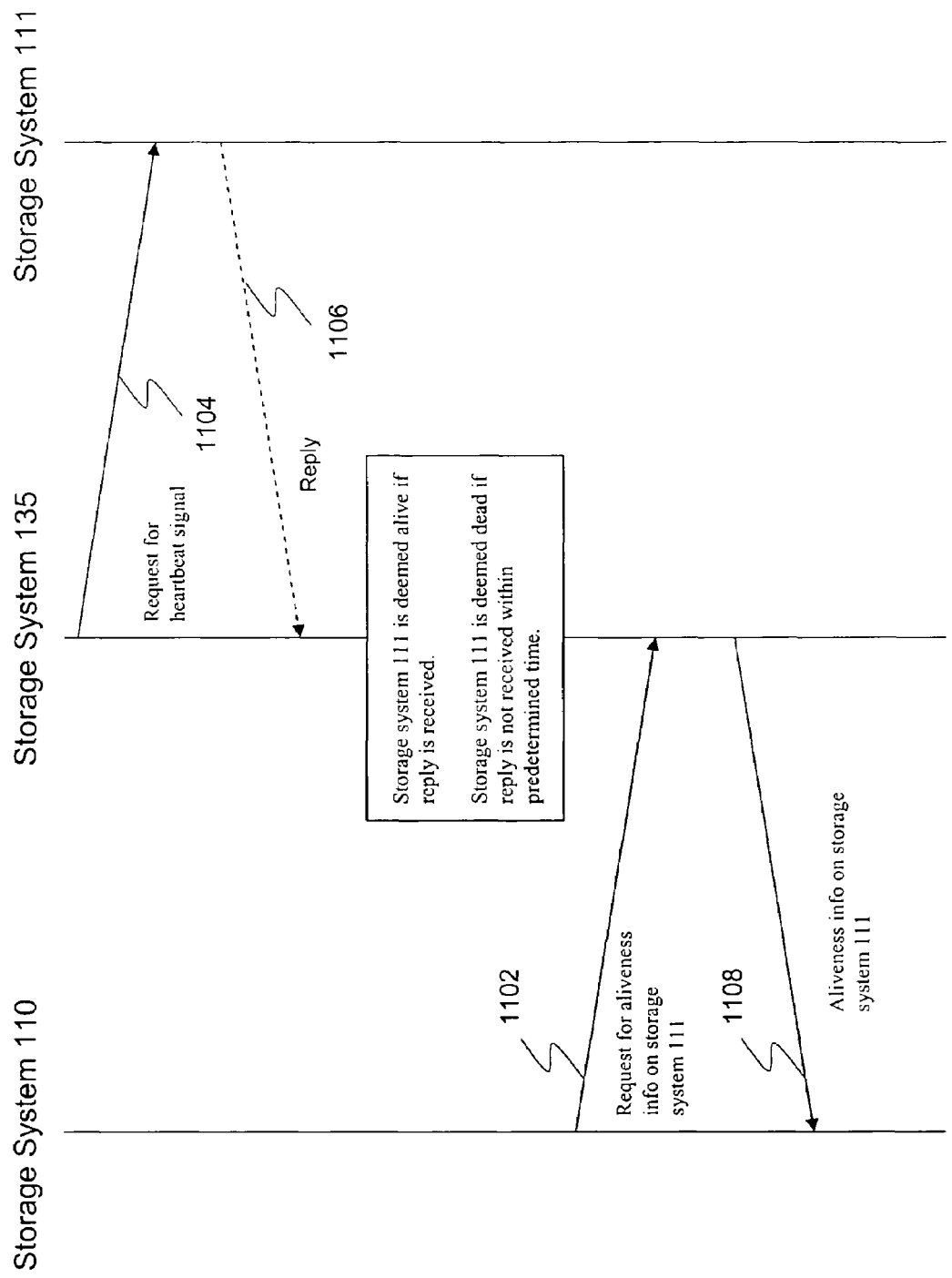
FIG. 11 illustrates a method of determining aliveness of an indirectly-linked storage system according to one embodiment of the present invention.

FIG. 11 illustrates a method, as used in connection with the distributed storage system 52 of FIG. 1B, of determining aliveness of storage systems without having the storage systems collect the topological information from each other according to one embodiment of the present invention. The storage system 110 sends a request for aliveness information of the storage system 111 to the storage system 135 (step 1102). The storage system 111 is indirectly linked to the storage system 110 via the storage system 135.

The storage system 135, in turn, sends a heartbeat signal request to the storage system 111 (step 1104). If a reply heartbeat signal is received from the storage system 111 within a predetermined time (or maximum tolerance time), the storage system is deemed to be alive (step 1106). If the reply is not received within the predetermined time, then the storage system 111 is deemed to be dead.

The storage system 135 sends a reply aliveness information to the storage system 110 including aliveness information of the storage system 111 (step 1108). The storage systems 110, 111, and 135 may or may not include the vitality tables 118a, 118b, and 118c in this particular implementation.

In another implementation, one or more storage systems include the vitality tables. For example, the storage system 135 may send the reply aliveness information using information obtained from its vitality table 118b without sending the heartbeat request to the storage system 111. That is, steps 1104 and 1106 are not performed in response to the request of step 1102. The vitality table 118b is updated periodically by sending heartbeat signals to the storage systems 110 and 111 at predetermined intervals rather than in response to a request from the storage system 110.

In yet another implementation, the storage system 135 sends aliveness information on the storage system 111 to the storage system 110 at predetermined intervals without waiting for a request from the storage system 110.

The present invention has been described in terms of specific embodiment above. The embodiments above may be modified without departing from the scope of the present invention. For example, although the alert and check modules 105 and 116 have been illustrated as a single module in the figures. Each of these modules may comprise a plurality of sub-modules. Accordingly, the scope of the present invention is defined by the appended claims.

What is claimed is:

1. A distributed storage system, comprising:
a first data center including a first host and a first storage subsystem that are coupled to each other via a network, the first host including a first check module configured to handle a heartbeat signal of first type, the first storage subsystem including a first storage controller and a first monitoring module, the first monitoring module being configured to handle a heartbeat signal of second type;
a second data center including a second host and a second storage subsystem that are coupled to each other via a network, the second host including a second check module configured to handle the heartbeat signal of first type, the second storage subsystem including a second storage controller and a second monitoring module, the second monitoring module being configured to handle the heartbeat signal of second type;
a third data center including a third storage subsystem that are coupled to each other via a network, the third host including a third check module configured to handle the heartbeat signal of first type, the third storage subsystem including a third storage controller and a third monitoring module, the third monitoring module being configured to handle the heartbeat signal of second type;
a first communication network coupling the first, second, and third hosts, wherein the hosts use the first communication network to transmit or receive the heartbeat signal of first type; and
a second communication network coupling the first, second, and third storage subsystems, wherein the subsystems use the second communication network to transmit or receive the heartbeat signal of second type.

2. The system of claim 1, further comprising:
a third host associated with the third data center, the third host being configured to handle the heartbeat signal of first type.

3. The system of claim 1, wherein the first, second and third storage subsystems respectively maintain first, second, and third vitality tables, each vitality table including topological information of the distributed storage system and vitality information of two or more of the storage subsystems.

4. The system of claim 1, wherein the second communication network is a remote mirroring network including a first link and a second link, the first link directly linking the first and third storage subsystems, the second link directly linking the second and third storage subsystem, wherein the first storage subsystem is indirectly linked to the second storage subsystem via the third storage subsystem.

5. The system of claim 4, wherein the first monitoring module is configured to obtain topological information from the third storage subsystem, the topological information including information about association of the second storage subsystem to the third storage subsystem.

6. The system of claim 5, wherein the first monitoring module is configured to receive vitality information of the second storage subsystem from the third storage subsystem, so that a first vitality table including the topological and vitality information may be maintained in the first storage subsystem.

7. The system of claim 6, wherein the second communication network is a remote mirroring network including a first link, a second link, and a third link, the first link directly linking the first and second storage subsystems, the second link directly linking the first and third storage subsystem, the third link directly linking the second and third storage subsystems.

8. The system of claim 7, wherein the first storage subsystem is a disk array unit and the first monitoring module and the first vitality table are managed by a disk array controller assigned to the first storage subsystem.

* * * * *